July 30, 1957
D. SEIFERT
2,801,055
HEATING SYSTEM CONTROL AND THERMOSTATICALLY
CONTROLLED SWITCH THEREFOR
Filed June 28, 1954
2 Sheets-Sheet 1
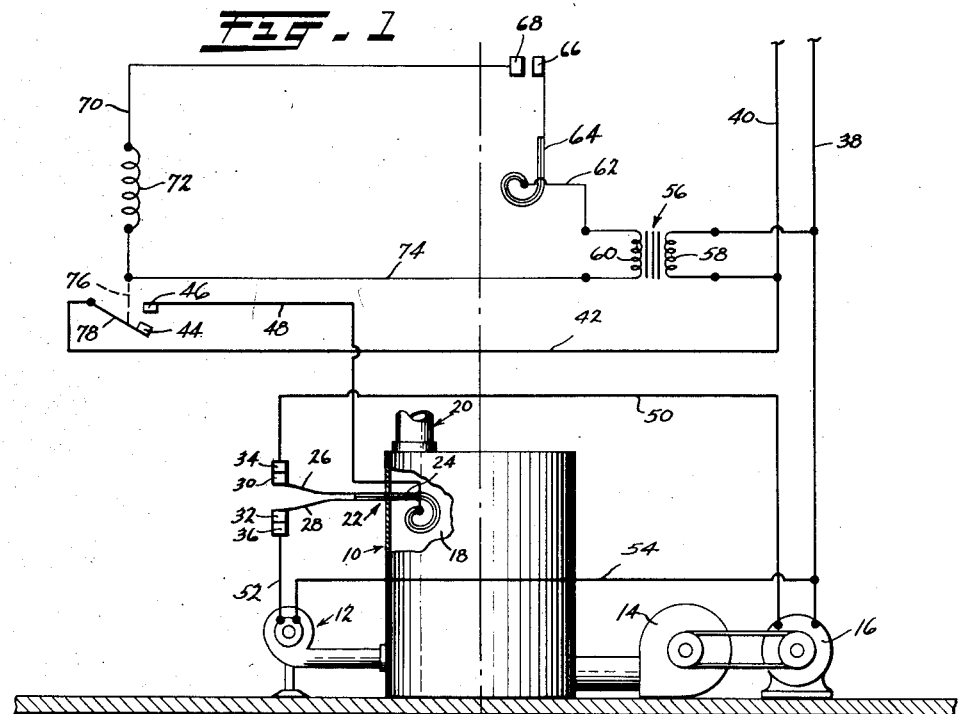
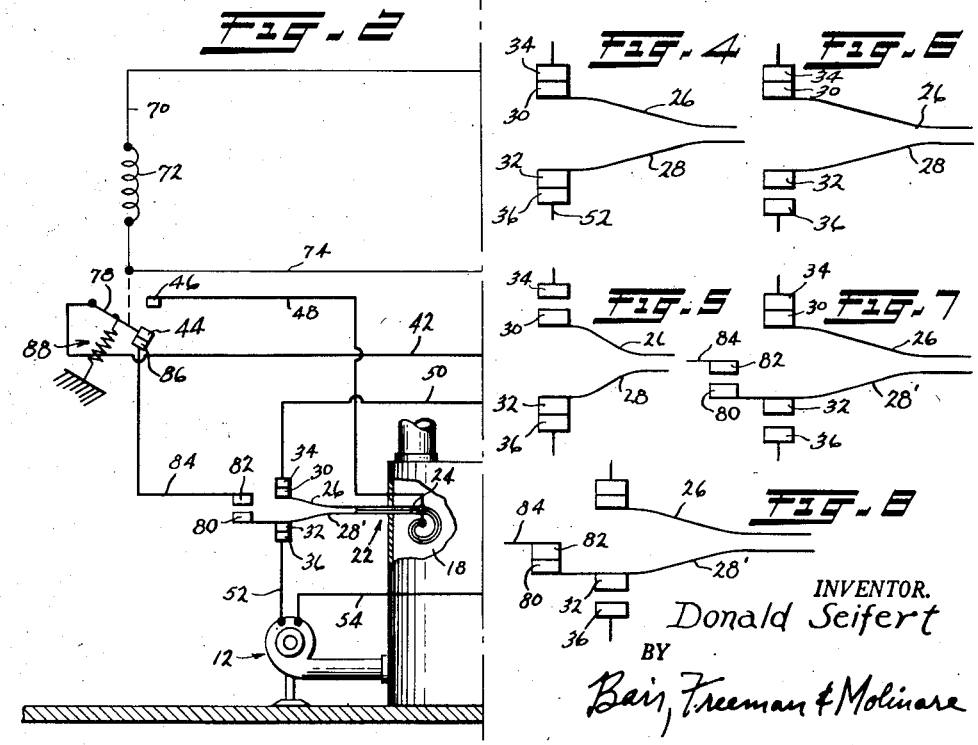
INVENTOR.
Donald Seifert
BY
Bair, Freeman & Molinare

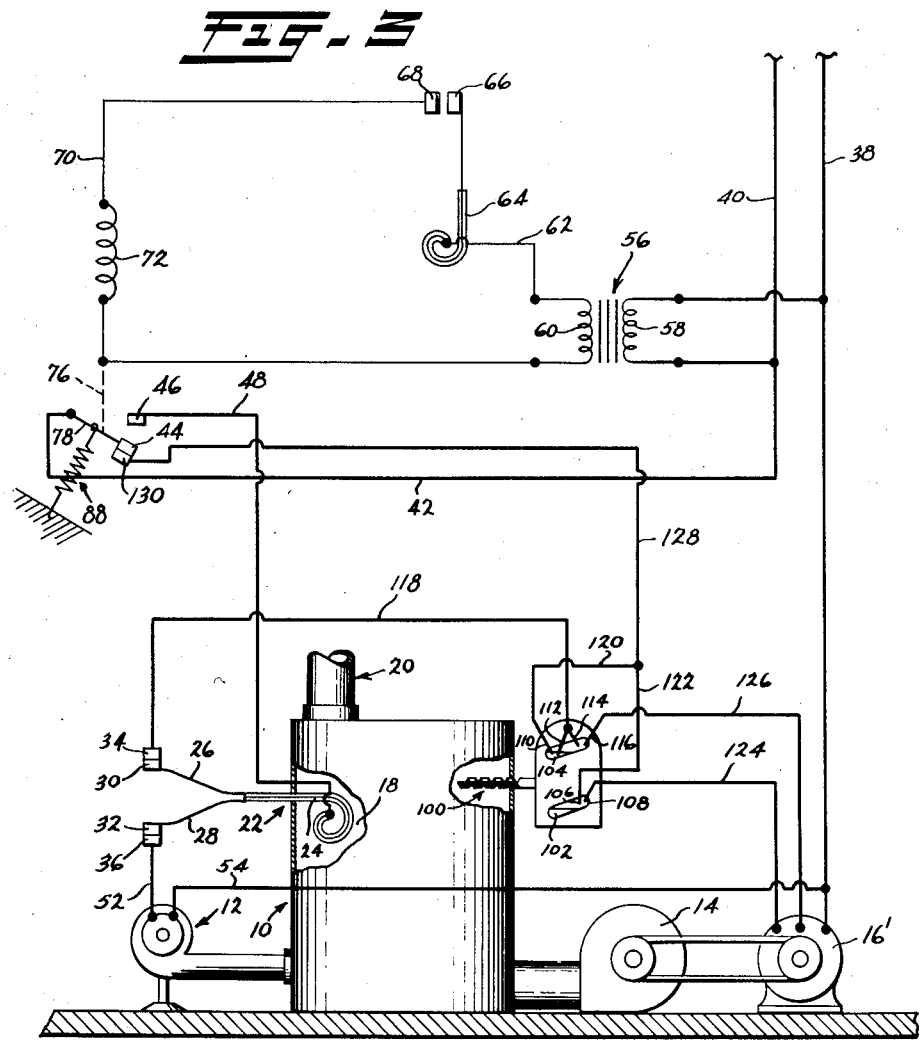

United States Patent Office 2,801,055
Patented July 30, 1957

2,801,055

HEATING SYSTEM CONTROL AND THERMOSTATICALLY CONTROLLED SWITCH THEREFOR

Donald Seifert, Highland Park, Mich.

Application June 28, 1954, Serial No. 439,758

9 Claims. (Cl. 236—9)

This invention relates to a heating system control and more particularly to a system of controls for a warm air furnace having in combination therewith a chamber wherein warm air may be stored and from whence warm air may be dispensed by a circulator, as required, to the space to be heated by the warm air. This invention is also directed to novel controls for use in a warm air heating system.

This invention is an improvement over that disclosed in my copending application, Serial No. 363,637, filed June 23, 1953, now issued as Patent 2,751,153.

In warm air furnaces, the warm air is usually stored in a warm air chamber, or bonnet, and from there the warm air is driven by a circulator to the space to be heated. The burner in such systems is designed to heat air more rapidly than it is withdrawn from the bonnet for distribution to the space to be heated.

In the operation of a heated-air heating system, the blower for distributing the heated air is responsive to the demands of a space thermostat mounted in the space to be heated. The space thermostat is so arranged that it calls for heat when the temperature in the space to be heated is below some predetermined temperature and does not call for heat after the temperature in the space to be heated rises to a second predetermined temperature. In some systems said first and second predetermined temperatures may be the same and in other systems they may be different, but that is of no concern in this invention.

It occasionally happens that the thermostat in the space to be heated does not call for any more heat but the rate of heat production in the furnace, just prior to satisfying the space thermostat, was such that the temperature in the bonnet rises to an excessively high value, and one that may be unsafe.

Upon the occurrence of such a condition, there must be some way of relieving the unsafe situation in the furnace bonnet. In this invention, it is contemplated that the blower will be turned on, or kept on if previously operating, thus supplying heated air to the space to be heated despite lack of demand by the space thermostat, and thus relieving the temporary unsafe condition in the furnace's bonnet. While the space to be heated might become uncomfortable during such an operation, this is more desirable than having an unsafe condition exist in the furnace bonnet.

Thus, it is one object of this invention to provide an improved heated-air heating system wherein provisions are made for relieving an unsafe excessively high temperature condition which may occur temporarily in the bonnet of the furnace.

Another object of this invention is to provide a heated-air heating system where the operation of the blower thereof is partly controlled both by the temperature in the space to be heated and by the temperature of the heated air in the bonnet of the furnace.

A further object of this invention is to provide a novel thermostatically controlled switch which may be used in a heated-air heating system which is characterized by its simplicity and inexpensiveness of construction.

Still another object of this invention is to provide a novel thermostatically controlled switch which controls the operating circuits of both the burner and the blower of a heated-air heating system in such a manner that when the thermostatic control of said switch is operating in a first temperature range both the burner and the blower operating circuits are prepared for energization, and when said thermostatic control is operating in a second temperature range, below said first temperature range, then the burner circuit is prepared for energization and the blower circuit is opened, and when said thermostatic control is operating in a third temperature range, above said first temperature range, then the blower circuit is prepared for energization and the burner circuit is opened.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 1 is a diagrammatic drawing of a heating system provided with controls for operating in accordance with my invention.

Figure 2 is a diagrammatic drawing of a modification of the system shown in Figure 1.

Figure 3 is a diagrammatic drawing of another modified form of the heating system wherein the blower that is used is one for high-low operation.

Figure 4 is a fragmentary view of a portion of the thermostatically controlled switch which is used in the systems shown in Figures 1–3, showing the arrangement of contracts when the thermostatic control for the switch is subjected to temperatures in a first temperature range.

Figure 5 shows the switch of Figure 4 when subjected to temperatures in a second temperature range.

Figure 6 shows the switch of Figure 4 when subjected to temperatures in a third temperature range.

Figure 7 shows a modified form of the switch of Figure 4, and one that is used in the system shown in Figure 2, when subjected to a subrange of temperatures in the third temperature range.

Figure 8 shows the modified switch of Figure 7 when subjected to a temperature of the third temperature range other than one in the subrange shown in Figure 7.

Referring now to the drawings, there is shown in Figure 1 a heating system for a house, or the like, comprising a warm air furnace generally indicated at 10, a fuel burner and fuel pump 12, a blower 14, a blower motor 16, and a warm air chamber, or bonnet, 18 in the upper portion of the furnace 10 within which warm air may be stored. There is provided duct means 20 leading from bonnet 18 through which warm air may be blown by blower 14 to the space to be heated.

There is also provided a furnace thermostat generally indicated at 22 which includes a temperature measuring element 24 responsive to the temperature in the bonnet 18. The temperature measuring element 24 carries thereon a pair of resilient spring leaves, or arms, 26 and 28. The spring leaves, or arms, 26 and 28, respectively, carry movable contacts 30 and 32 thereon. The contacts 30 and 32, referred to as movable since they may be moved relative to their cooperating contacts, are adapted to cooperate respectively with a pair of spaced fixed contacts 34 and 36. The spring leaves 26 and 28 and the pairs of contacts 30—34, and 32—36, are so constructed and arranged so as to provide a particular operational pattern which will be described hereinafter.

A source of power is provided for operating the burner and fuel pump 12, and the blower motor 16. The source of power is carried by lines 38 and 40. The circuit for energizing the blower 16 includes lines 40 and 42, contacts 44 and 46, line 48, thermostat 22, resilient leaf 26, contacts 30—34, and line 50 to the blower motor 16 and from thence back to line 38. The circuit for energizing the burner 12 includes lines 40 and 42, contacts 44 and 46, line 48, thermostat 22, resilient leaf 28, contacts 32—36, line 52 to burner 12, from burner 12 to line 54 and back to lead line 38.

The contacts 44 and 46 are operated by a control circuit which will now be described. In this system, the control of contacts 44 and 46 is by means of a control circuit. A transformer is indicated at 56 and includes a primary coil 58 which is connected across the lines 40 and 38. The secondary coil 60 of the transformer powers the control circuit. The control circuit includes the secondary coil 60, the line 62, a space thermostat 64, contacts 66 and 68, line 70, solenoid coil 72, and line 74 back to the secondary coil 60. The solenoid coil 72 operates a solenoid plunger 76 that is connected to the swingable arm 78 that carries the contact 44. When the control circuit is energized by the closing of contacts 66 and 68, the solenoid plunger 76 is drawn upwardly so that contacts 44 and 46 are made. When the control circuit is broken, upon the separation of contacts 66 and 68, then the contacts 44 and 46 are separated as shown.

The space thermostat 64 is mounted in the space to be heated and is responsive to the temperature in said space so as to make and break the control circuit. The space thermostat 64 is so constructed and arranged that when the temperature in the space to be heated falls below a predetermined temperature, contact 66 is moved into engagement with contact 68 and the secondary circuit is energized. When the temperature in the space to be heated rises to a predetermined temperature the contacts 66 and 68 are separated thus deenergizing the control circuit.

The thermostatic switch 22, as has been noted earlier, carries a pair of spring leaves 26 and 28 each of which carries one of said movable contacts, 30 and 32, thereon. The spring leaves 26 and 28 are resilient and thereby are adapted to afford relative movement of said arms toward and away from each other and thereby affords relative movement of said contacts 30 and 32 toward and away from each other. As initially constructed, spring leaves 26 and 28 are so designed that the movable contacts 30 and 32 carried thereby are normally spaced apart a predetermined distance. The fixed contacts 34 and 36, which the movable contacts 30 and 32 are adapted to cooperate with, are spaced apart a distance less than the initial spacing of the movable contacts 30 and 32. The thermostat 22 is so arranged relative to the fixed contacts 34 and 36 that in a first temperature range, to which the temperature responsive element 24 may be subjected, the contacts 30—34 and 32—36 are simultaneously in engagement, thus forming two spaced pairs of contacting elements wherein both pairs of contacting elements are made. This permits the thermostat 22 to serve as a common portion of the circuit to both the burner 12 and to the blower motor 16. The position of the contacts in this first temperature range is shown in Figure 4.

Said thermostatic switch 22, in addition to the above construction and arrangement, is so constructed and arranged that when the temperature in the bonnet 18 to which the temperature responsive element 24 is subjected, is in a second temperature range, which is below the lower limit of the first temperature range, then the spring leaf 26 is moved toward the spring leaf 28 sufficiently so as to break the circuit between contacts 30 and 34 by moving the contact 30 away from engagement with contact 34, and thus operating to shut off the blower. The operation in this second temperature range is shown in Figure 5.

In addition to the above, the thermostatic element 22 is so constructed and arranged that when the temperature in the bonnet 18 enters a third temperature range, which includes temperatures above the upper limit of the first temperature range, then the spring leaf 28 moves toward the spring leaf 26 sufficiently to cause separation between contacts 32 and 36. The operation of the burner 12 is thus cut off because the operating circuit of the burner 12 is broken while the circuit operating the blower motor 16 remains prepared for energization thereof. The position of the parts when in the third temperature range is shown in Figure 6.

In Figure 2, there is shown a modification of the system shown in Figure 1, and the modified portion of the system is shown to the left of a vertical dot-dash line A. The portion of the system shown in Figure 2 to the right of a vertical dot-dash line A is the same as the portion of the system to the right of that line of Figure 1.

In Figure 2, it is desired to provide means for operating the burner 14 in case an abnormally high temperature condition is obtained in the bonnet 18 due to previous operation of the burner at a higher rate than could have been accommodated by the blower 14. Normally, in the operation of Figure 1, after the temperature in the space to be heated has been satisfied the temperature in said space operates the thermostat 64 to separate contacts 66 and 68 and this results in the deenergization of both the burner and the blower circuits because of the separation of contacts 40 and 46. Assuming that the space thermostat 64 has been satisfied as to its temperature requirements, in some situations it may be desirable to dissipate the heat from the bonnet 18 into the space to be heated even though the thermostat 64 has ceased to call for additional heat. The discomfort of the people in the space to be heated may be considered to be of less importance than the safety of the entire system. In such an event, it is desired to provide a system by means of which the blower may continue to operate despite the fact that contacts 66 and 68 which are controlled by the space thermostat 64 have been separated.

To accomplish this result, the thermostat 22' is provided with a spring leaf 28', which in addition to carrying contact 32' also carries a third movable contact 80. The movable contact 80 is adapted to cooperate with a third fixed contact 82. The fixed contact 82 is connected to the power supply by means of line 84 and contact 86 which is adapted to engage contact 44 as shown. The contact 86 is engaged by the contact 44 after the control circuit through the space thermostat 64 has been deenergized, thus permitting movement of the contact 44 away from contact 46. To insure contact between contacts 44 and 86, spring means indicated at 88 may be provided.

With respect to the operation of the thermostatic switch 22', the third temperature range defined hereinabove has a subrange of temperature therein which is located immediately above the upper limit of said first temperature range. When the thermostatic switch 22' is operating in said subrange of the third thermperature range, then the parts of the switch are in the position shown in Figure 7. In this position, the blower circuit is prepared for energization while the actual energization of the blower circuit is still controlled by the control circuit which includes the space thermostat 64. However, if the temperature in the furnace bonnet 18 continues to rise, then the spring leaf 28' is moved still further toward the spring leaf 26' and this results in the engagement of contacts 80 and 82. The engagement of contacts 80 and 82 insures the energization of the blower motor circuit regardless of whether or not the space thermostat 64 is calling for additional heat. The position that is then taken by the parts of the thermostatic switch 22', in such a condition, is shown in Figure 8.

In Figure 3, the portions of the heated air system which corresponds with the portions shown in Figure 1 are numbered similarly. The system in Figure 3 is for use with a high-low speed blower motor 16' as contrasted with the single speed blower motor shown in Figure 1. The use of a high-low speed blower is intended to give constant heated air circulation with varying amounts of heat being delivered when there is heated air in the furnace bonnet, and also provides a system which does not deliver when there is no heated air in the bonnet. In some instances it is desirable to have constant circulation of heated air while heating a house in order that cold spots in various rooms may be avoided.

To provide the necessary control for the high-low speed motor, there is shown a temperature responsive element 100 which is responsive to the temperature in the bonnet 18 of the furnace 10. The temperature responsive element 100 is operative to control a pair of mercury switches 102 and 104. The mercury switches 102 and 104 that are controlled by the temperature responsive element 100 are interposed in the blower motor's energizing circuit between the contact 34 and the blower motor 16'. The mercury switches 102 and 104 are shown in Figure 3 in their positions when the temperature of the air in bonnet 18 is considered too "cold" to be delivered to the space to be heated.

Within the mercury switch 102 there are two spaced contacts 106 and 108 which are not electrically connected when the switch 102 is in the position shown in Figure 3, but which are electrically connected when switch 102 is swung to its alternate, or make, position. In mercury switch 104 there are four spaced contacts 110, 112, 114 and 116, of which the pair of spaced contacts 110 and 112 are electrically connected when the mercury switch 104 is in the position shown in Figure 3, while spaced contacts 114 and 116 are not electrically connected; and wherein spaced contacts 114 and 116 are electrically connected when the mercury switch 104 is thrown to its alternate position while in said alternate position contacts 110 and 112 are not electrically connected.

With respect to the electrical circuit interconnections between the various contacts of the various switches described, there is a line 118 which connects contact 34 with both of the contacts 112 and 114. Contacts 110 and 106 are electrically connected by lines 120 and 122. Contact 108 is connected to the blower motor 16' by means of a line 124. The contact 116 is connected to the blower motor 16' by means of a line 126. In addition to the above, the contacts 106 and 110 are connected through lines 122 and 120 to a line 128 which then connects to a fixed contact 130 that is adapted to be engaged by swingable contact 44 when the control circuit through the space thermostat 64 is deenergized.

When the temperature of the air in the bonnet 18 is cold the mercury switches 102 and 104 are positioned as shown in Figure 3 and the blower motor 16' does not operate. As the air in the bonnet 18 warms up, the mercury switch 102 is set to swing to its alternate position at a first predetermined temperature; thereafter, as the temperature in bonnet 18 continues to rise the switch 104 is caused to swing to its alternate position at a second predetermined temperature that is higher than said first predetermined temperature.

Thus, when the temperature of the air in the bonnet 18 is at a point between said first predetermined temperature and said second predetermined temperature, and assuming that the space thermostat 64 is calling for heat and thus energizing the control circuit, a blower motor energizing circuit is established including lines 40 and 42, contacts 44—46, line 48, thermostat 22, spring leaf 26, contacts 30—34, line 118, contacts 112—110, lines 120 and 122, contacts 106—108, line 124 to blower motor 16', and from blower 16' back to line 38. This energizing circuit is operative to cause the blower motor 16' to operate at a low speed for operating the blower 14 at a low speed.

After the temperature in the bonnet 18 has risen to a point above the second predetermined temperature, and assuming that the space thermostat 64 is calling for heat and thus energizing the control circuit, a blower motor energizing circuit for operating the blower motor 16' at a high speed is established which comprises lines 40 and 42, contacts 44—46, line 48, thermostat 22, spring leaf 26, contacts 30—34, line 118, contacts 114—116, line 126 to blower motor 16', and from blower motor 16' back to line 38.

Even though the space thermostat 64 is not calling for heat thus deenergizing the control circuit, as long as the temperature in the bonnet 18 is above said first predetermined temperature, means are provided for delivering heat from the bonnet 18 at low speed, and the energizing circuit for blower motor 16' under these circumstances comprises lines 40 and 42, contacts 44—130, lines 128 and 122, contacts 106—108, lines 124 to blower motor 16', and from blower motor 16' back to line 38.

In addition to the above, a standard safety switch (not shown) may be located in the system so that if the bonnet 18 gets too hot the safety switch will be operative to turn the burner 12 off. Such a safety switch is well known and is not relied upon herein for the novelty of the system described.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A thermostatically controlled switch comprising a temperature responsive element carrying a pair of spaced movable contacts, a pair of fixed contacts spaced apart a distance less than the normal spacing of said movable pair of contacts, said temperature responsive element being positioned so that the pair of movable contacts is positioned between said pair of fixed contacts, said pair of movable contacts being resiliently mounted, thereby affording relative movement therebetween toward and away from each other, said temperature responsive element being so constructed and arranged that, in a first temperature range, the resilient mounting of said pair of movable contacts maintains said pair of movable contacts in engagement with said pair of fixed contacts, thereby forming two spaced pairs of contacting elements wherein both pairs of contacting elements are made, and in a second temperature range, below said first temperature range, one pair of said contacting elements is made and the second pair of contacting elements is broken, and in a third temperature range, above said first temperature range, said second pair of contacting elements is made and said first pair of contacting elements is broken.

2. A thermostatically controlled switch comprising a temperature responsive element carrying a pair of spaced movable contacts, a pair of fixed contacts spaced apart a distance less than the normal spacing of said movable pair of contacts, said temperature responsive element being positioned so that the pair of movable contacts is positioned between said pair of fixed contacts, said pair of movable contacts being resiliently mounted, thereby affording relative movement therebetween toward and away from each other, said temperature responsive element being so constructed and arranged that in a first temperature range said pair of movable contacts are in engagement with said pair of fixed contacts, thereby forming two spaced pairs of contacting elements wherein both pairs of contacting elements are made, and in a second temperature range, below said first temperature range, one pair of said contacting elements is made and the second pair of contacting elements is broken, and in a third temperature range, above said first temperature range, said second pair of contacting elements is made and said first pair of contacting elements is broken, said temperature responsive element carrying a third movable contact, and a third fixed contact adapted to cooperate with said third movable contact to define a third pair of contacting elements adapted to make and break a circuit therethrough, said third pair of contacting elements being broken when said temperature responsive element is in said first temperature range and being made after the temperature responsive element is moved to a position to break contact between one of said first two pairs of contacting elements.

3. A thermostatically controlled switch comprising a temperature responsive element movable over a continuous range of positions in response to a continuous range of temperatures, a pair of resilient spring leaves carried by said temperature responsive element and defining spaced arms, a movable contact carried by each of said spaced arms, a pair of fixed contacts spaced apart a distance less than the normal spacing of said movable contacts, said temperature responsive element being positioned so that the movable contacts are positioned between said fixed contacts, said temperature responsive element being so constructed and arranged that, in a first temperature range, said spring leaves operate to maintain each of said movable contacts in engagement with one of said fixed contacts, in a second temperature range, below said first temperature range, a first of said movable contacts is in engagement with a first fixed contact and the other contacts are separated, and in a third temperature range, above said first temperature range, the second movable contact is in engagement with the second fixed contact and the first contacts are separated.

4. A thermostatically controlled switch comprising a temperature responsive element movable over a continuous range of positions in response to a continuous range of temperatures, a pair of resilient spring leaves carried by said temperature responsive element and defining spaced arms, a movable contact carried by each of said spaced arms, a pair of fixed contacts spaced apart a distance less than the normal spacing of said movable contacts, said temperature responsive element being positioned so that the movable contacts are positioned between said fixed contacts, said temperature responsive element being so constructed and arranged that in a first temperature range each of said movable contacts is in engagement with one of said fixed contacts, in a second temperature range, below said first temperature range, a first of said movable contacts is in engagement with a first fixed contact and the other contacts are separated, and in a third temperature range, above said first temperature range, the second movable contact is in engagement with the second fixed contact and the first contacts are separated, one of said arms carrying a third movable contact, and a third fixed contact adapted to cooperate with said third movable contact to make and break a circuit therethrough, said third contacts being separated when said temperature responsive element is in said first temperature range and becoming engaged after said temperature responsive element enters one of the other two temperature ranges.

5. A thermostatically controlled switch comprising a temperature responsive element movable over a continuous range of positions in response to a continuous range of temperatures, a pair of resilient spring leaves carried by said temperature responsive element and defining spaced arms, a movable contact carried by each of said spaced arms, a pair of fixed contacts spaced apart a distance less than the normal spacing of said movable contacts, said temperature responsive element being positioned so that the movable contacts are positioned between said fixed contacts, said temperature responsive element being so constructed and arranged that in a first temperature range each of said movable contacts is in engagement with one of said fixed contacts, in a second temperature range, below said first temperature range, a first of said movable contacts is in engagement with a first fixed contact and the other said contacts are separated, in a third temperature range, above said first temperature range, the second movable contact is in engagement with the second fixed contact and said first contacts are separated, the arm that carries said first movable contact also carrying a third movable contact, a third fixed contact adapted to cooperate with said third movable contact to make and break a circuit therethrough, said third contacts being separated when said temperature responsive element is in said first temperature range and becoming engaged after said temperature responsive element enters said third temperature range, and there being a temperature subrange, within said third temperature range and immediately above said first temperature range, wherein said second contacts are made and said third contacts are broken.

6. In a heating system, a warm air furnace including a fuel burner and a warm air chamber in which heated air may be stored, a single furnace thermostat being electrically conductive and having a temperature measuring element responsive to the temperature in said warm air chamber, a blower for blowing the warm air from the warm air chamber to a space to be heated by said warm air, a space thermostat in said space to be heated, a control circuit having interposed therein a pair of control contacts, one of which is carried by said space thermostat for movement to make and break said control circuit respectively when the temperature in the space to be heated falls below and rises above a predetermined temperature, a source of electric power for energizing said control circuit and for operating said heater and blower, said heater and said blower each being connected to said source of power by means of electric energizing circuits, the electric energizing circuits for said heater and said blower each having a pair of operating contacts therein, one contact of each pair of operating contacts being operatively associated with said single furnace thermostat, said electric circuits for the burner and the blower having a common circuit portion, a pair of common contacts in said common circuit portion controlled to make or break respectively in response to making or breaking of said control circuit, and said single furnace thermostat carrying a plurality of electric circuit contacts and constituting a portion of the energizing circuits for both said heater and blower and being so constructed and arranged that in a first temperature range the energizing circuits to the blower and the burner are both made, in a second temperature range, below said first temperature range, the burner circuit is made and the blower circuit is broken, and in a third temperature range, above said first temperature range, the blower circuit is made and the burner circuit is broken.

7. In a heating system, a warm air furnace including a fuel burner and a warm air chamber in which heated air may be stored, a single furnace thermostat being electrically conductive and having a temperature measuring element responsive to the temperature in said warm air chamber, a blower for blowing the warm air from the warm air chamber to a space to be heated by said warm air, a space thermostat in said space to be heated, a control circuit having interposed therein a pair of control contacts, one of which is carried by said space thermostat for movement to make and break said control circuit respectively when the temperature in the space to be heated falls below and rises above a predetermined temperature, a source of electric power for energizing said control circuit and for operating said heater and blower, said heater and said blower each being connected to said source of power by means of electric energizing circuits, the electric energizing circuits for said heater and said blower each having a pair of operating contacts therein, one contact of each pair of operating contacts being operatively associated with said single furnace thermostat, said electric circuits for the burner and the blower having a common circuit portion, a pair of common contacts in said common circuit portion controlled to make or break respectively in response to making or breaking of said control circuit, and said single furnace thermostat carrying a plurality of electric circuit contacts and constituting a portion of the energizing circuits for both said heater and blower and being so constructed and arranged that in a first temperature range the energizing circuits to the blower and the burner are both made, in a second temperature range, below said first temperature range, the burner circuit is made and the blower circuit is broken, in a third temperature range, above said first temperature range, the blower circuit is made and the burner circuit is broken, and there being a safety circuit which includes, in part, said single furnace thermostat, for remaking the blower circuit after said pair of common contacts are broken and upon the temperature in said warm air chamber rising to a predetermined level above said first temperature range.

8. In a heating system, a warm air furnace including a fuel burner and a warm air chamber in which heated air may be stored, a furnace thermostat having a temperature measuring element responsive to the temperature in said warm air chamber, a blower for blowing the warm air from the warm air chamber to a space to be heated by said warm air, a space thermostat in said space to be heated, a control circuit having interposed therein a pair of control contacts, one of which is carried by said space thermostat for movement to make and break said control circuit respectively when the temperature in the space to be heated falls below and rises above a predetermined temperature, a source of electric power for energizing said control circuit and for operating said heater and blower, said heater and said blower each being connected to said source of power by means of electric circuits, the electric circuits for said heater and said blower each having a pair of operating contacts therein, one contact of each pair of operating contacts being operatively associated with said furnace thermostat, said electric circuits for the burner and the blower having a common circuit portion, a pair of common contacts in said common circuit portion controlled to make or break respectively in response to making or breaking of said control circuit, and said furnace thermostat being so constructed and arranged that in a first temperature range the circuits to the blower and the burner are both made, in a second temperature range, below said first temperature range, the burner circuit is made and the blower circuit is broken, in a third temperature range, above said first temperature range, the blower circuit is made and the burner circuit is broken, said blower having high and low speeds, means operative upon the temperature in said warm air chamber reaching a first predetermined level for initiating low speed operation of said blower means, and means operative upon the temperature in said warm air chamber reaching a second predetermined level, above said first predetermined level, and upon said space thermostat calling for heat for initiating high speed operation of said blower means.

9. In a heating system, a warm air furnace including a fuel burner and a warm air chamber in which heated air may be stored, a furnace thermostat having a temperature measuring element responsive to the temperature in said warm air chamber, a blower for blowing the warm air from the warm air chamber to a space to be heated by said warm air, a space thermostat in said space to be heated, a control circuit having interposed therein a pair of control contacts, one of which is carried by said space thermostat for movement to make and break said control circuit respectively when the temperature in the space to be heated falls below and rises above a predetermined temperature, a source of electric power for energizing said control circuit and for operating said heater and blower, said heater and said blower each being connected to said source of power by means of electric circuits, the electric circuits for said heater and said blower each having a pair of operating contacts therein, one contact of each pair of operating contacts being operatively associated with said furnace thermostat, said electric circuits for the burner and the blower having a common circuit portion, a pair of common contacts in said common circuit portion controlled to make or break respectively in response to making or breaking of said control circuit, and said furnace thermostat being so constructed and arranged that in a first temperature range the circuits to the blower and the burner are both made, in a second temperature range, below said first temperature range, the burner circuit is made and the blower circuit is broken, in a third temperature range, above said first temperature range, the blower circuit is made and the burner circuit is broken, said blower having high and low speeds, means operative upon the temperature in said warm air chamber reaching a first predetermined level for initiating low speed operation of said blower means, means operative upon the temperature in said warm air chamber reaching a second predetermined level, above said first predetermined level, and upon said space thermostat calling for heat, for initiating high speed operation of said blower means, and there being a safety circuit which includes, in part, said furnace thermostat, for remaking the blower circuit after said pair of common contacts are broken and upon the temperature in said warm air chamber rising to a third predetermined level above said first temperature range.

References Cited in the file of this patent

UNITED STATES PATENTS

| | | |
|---|---|---|
| 1,951,663 | Kriechbaum | Mar. 20, 1934 |
| 2,073,676 | Broderick | Mar. 16, 1937 |
| 2,139,615 | Dillman | Dec. 6, 1938 |
| 2,271,813 | Clayton, Jr. | Feb. 3, 1942 |
| 2,312,353 | Miller | Mar. 2, 1943 |
| 2,322,405 | White | June 22, 1943 |
| 2,593,812 | Turner | Apr. 22, 1952 |
| 2,641,668 | Larocco | June 9, 1953 |